United States Patent [19]

Bruning et al.

[11] Patent Number: 4,882,666
[45] Date of Patent: Nov. 21, 1989

[54] HIGH FREQUENCY HIGH VOLTAGE POWER SUPPLY WITH CONTROLLED OUTPUT POWER

[75] Inventors: Gert W. Bruning, Tuckahoe; Edward H. Stupp, Spring Valley, both of N.Y.

[73] Assignee: North American Philips Corporation, New York, N.Y.

[21] Appl. No.: 328,377

[22] Filed: Mar. 23, 1989

[51] Int. Cl.$^4$ .................... H02P 13/18; H02M 3/337
[52] U.S. Cl. ...................................... 363/97; 363/133; 363/134
[58] Field of Search .................. 363/22, 23, 24, 25, 363/26, 97, 133, 134; 219/10.55 B

[56] References Cited

U.S. PATENT DOCUMENTS

| | | | |
|---|---|---|---|
| 3,417,314 | 12/1968 | Menke | 363/133 |
| 3,634,701 | 1/1972 | STudtmann | 363/134 |
| 3,921,005 | 11/1975 | Watrous | 363/25 |
| 4,480,300 | 10/1984 | Luursema | 363/134 |
| 4,609,850 | 9/1986 | Hanlet | 363/23 |
| 4,628,284 | 12/1986 | Bruning et al. | 363/22 |
| 4,709,323 | 11/1987 | Lien | 363/134 |

FOREIGN PATENT DOCUMENTS

| | | | |
|---|---|---|---|
| 0001275 | 1/1986 | Japan | 363/134 |
| 0884070 | 11/1981 | U.S.S.R. | 363/134 |

*Primary Examiner*—Peter S. Wong
*Attorney, Agent, or Firm*—Bernard Franzblau

[57] ABSTRACT

A push-pull high voltage oscillator power supply circuit includes a parallel resonant LC circuit made up of a capacitor in parallel with the primary of an output transformer. The output power level of the oscillator is controlled or adjusted by gating a drive circuit of the oscillator in accordance with an appropriate timing scheme so as to control the power delivered to the load over a long time period. The drive circuit is switched on and off so as to control the transformer primary voltage by omitting a number of drive pulses, determined by the desired output pulse level, so that the oscillator self-oscillates and rings out with a decreasing amplitude of the self-oscillations, but never reaches a complete cut-off of the oscillations before the drive circuit is gated on to refresh the supply of energy to the oscillator. A circuit for monitoring the collector voltages of the switching transistors of the oscillator may be provided to inhibit the supply of drive pulses to the switching transistors when the collector voltages exceed a given voltage level. This limits the power dissipation in the switching transistors.

9 Claims, 3 Drawing Sheets

HIGH FREQUENCY HIGH VOLTAGE POWER SUPPLY WITH CONTROLLED OUTPUT POWER

BACKGROUND OF THE INVENTION

This invention relates to apparatus for generating high voltages and, more particularly, to a high frequency high voltage power supply with means for controlling or varying its output power.

High voltage generators or power supplies are required for various types of applications, for example, to energize a magnetron in a microwave oven. One such power supply apparatus is described in U.S. Pat. No. 4,628,284, which issued Dec. 9, 1986 in the name of Bruning and Fellows, the disclosure of which is hereby incorporated by reference. As will become apparent from the description below, the present invention is in some respects an improvement over the high frequency high voltage power supply described in that U.S. patent. The patent discloses a current-fed parallel resonant oscillator that includes a pair of push-pull operating transistors coupled to a parallel resonant circuit that includes a transformer having a center-tapped primary winding and a capacitor connected in parallel therewith. The transformer primary voltage is given by the following expression, $$\hat{V}_{pri} = V_{cc}\pi \frac{T}{2\, t_{on}}$$

where $\hat{V}_{pri}$ = peak primary voltage; T = switching interval; $t_{on}$ = on-time of one transistor. The voltage envelope over a long time period ($>>T$) is of constant amplitude.

The power delivered to the load is then $$P = \frac{(\hat{V}_{AB}/\sqrt{2})^2}{R_L}$$

where:

$$\hat{V}_{AB} = \hat{V}_{pri} \cdot N_{s1}/N_{p1}; \; N_{p1}=N_{p2}$$

assuming ideal coupling; and where $R_L$ is the load resistance connected to the output terminals of the power supply. The output power can therefore be controlled by controlling the transformer primary voltage.

Consumer microwave ovens generally employ a magnetron energized by a ferroresonant power supply operating at the power line frequency to supply microwave heating energy to the cooking cavity of the oven. The output power of this power supply is discontinuously controlled by means of a control circuit which disconnects the 60 Hz AC supply voltage in order to vary the average microwave heating power applied to a load in the oven capacity. In one mode of operation, the magnetron will typically be pulsed on for approximately one second and will be pulsed off for approximately 10 seconds. As a result, the magnetron heater filament is repetitively heated and cooled which produces stresses on the magnetron which reduce its useful life. It would therefore be advantageous to provide a means for varying the average microwave power applied to a cooking load in a smooth and continuous manner so as to keep the magnetron heater filament energized at all times during operation of the oven. The high voltage power supply described in the patent solves the problem by providing continuous power control using a self-sustaining power oscillator with inherent self regulation of its output power.

Another apparatus for generating high voltages is disclosed in U.S. Pat. No. 3,417,314 which issued on Dec. 7, 1968. This patent describes a high-efficiency, high voltage generator consisting of a DC voltage converter that includes a transistor oscillator that is gated on and off by a gating circuit so that the oscillations are interrupted periodically. As a result, the rms tank voltage is zero for a part of each period of operation of the apparatus.

SUMMARY OF THE INVENTION

It is therefore an object of the invention to provide a high voltage power supply that makes it possible to control the output power supplied to a load over a wide power range.

A further object of the invention is to provide a simple and inexpensive power control circuit that eliminates certain expensive components in the known high voltage power supplies.

Another object of the invention is to provide a controlled or variable high voltage power supply for a magnetron or similar type of load that supplies continuous current or power to the magnetron thereby reducing temperature fluctuations in the magnetron filament, which in turn extends the useful life of the magnetron.

A further object of the invention is to provide a high voltage power supply having a low voltage, low current control circuit which provides a significant reduction in the cost of the circuit.

A still further object of the invention is to provide a detection circuit that senses the collector voltages of the switching transistors and disables the transistor drive circuit at a predetermined value of collector voltage thereby to limit the power dissipation in the switching transistors.

In accordance with the invention, a push-pull current fed parallel resonant oscillator circuit power supply has been modified and improved so as to control or adjust its output power by gating the drive circuit by means of a timing arrangement which allows the rms voltage delivered to a load over a long time period ($>T$) to be controlled in a simple and inexpensive manner. This is accomplished by controlling the transformer primary voltage by enabling and disabling the oscillator drive circuit in accordance with a desired timing scheme, which may be adjusted to vary the output power, thereby allowing the oscillator LC tank circuit (comprising the transformer primary winding and a parallel connected capacitor) to "ring out" during the absence of the drive pulses. However, at no time is the drive to the oscillator circuit removed for a time period sufficient to allow the oscillations to become completely cut-off or interrupted. The voltage amplitude of the oscillator circuit is modulated continuously by omitting a number of switching transistor cycles so as to reduce or increase the amount of refresh energy supplied to the oscillator tank circuit as a function of the desired output power of the oscillator power supply. The rms tank voltage is never allowed to reach zero voltage. By varying the frequency of the drive circuit enable/disable pulses it is possible to achieve a wide range of control of the output power. The method of drive "pulse omission", in combination with the automatic adjustment of the drive pulse to cause a delay at turn-off of the switching transistors, makes it possible to control the power delivered to a load over a wide power range.

In the case where the high voltage power supply operates a magnetron load, for example, in a microwave oven, better cooking results are obtained by the continuous control of power provided by the invention in contrast to known microwave ovens in which the magnetron is pulsed on and off.

In a preferred embodiment of the invention, a detection circuit senses the collector voltage of the switching transistors of the inverter oscillator and, in the event the collector voltage exceeds a predetermined amplitude level, applies a disable signal to the push-pull drive circuit thereby preventing the switching of the switching transistors. This feature prevents high power dissipation in the switching transistors thereby making the apparatus more efficient.

The invention further comprises a novel method for generating and supplying oscillatory power to a load in a continuous manner.

BRIEF DESCRIPTION OF THE DRAWINGS

The above and further objects and advantages of the invention will become apparent from the following detailed description thereof with reference to the accompanying drawing, in which.

DESCRIPTION OF THE PREFERRED EMBODIMENTS

Figure 1:
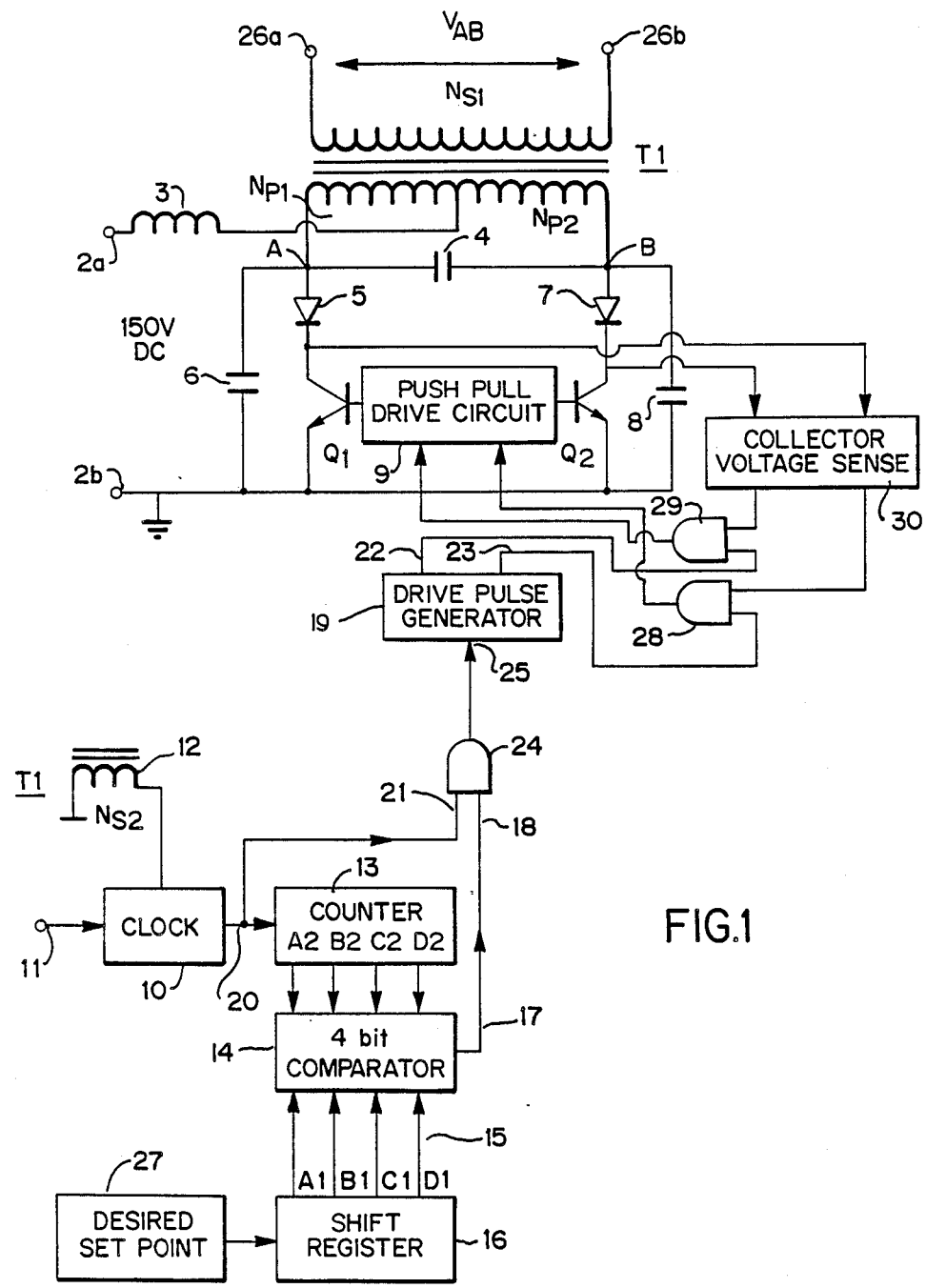
FIG. 1 is a schematic diagram of a preferred embodiment of the invention.

FIG. 1 is a schematic block diagram that illustrates the principles of this new high frequency, high voltage intermittently driven self oscillating power supply apparatus. The power supply includes a current fed parallel LC resonant power oscillator 1 similar in construction and operation to the power oscillator of U.S. Pat. No. 4,628,284 discussed above. It includes a pair of DC supply voltage terminals 2a, 2b with the positive (+) terminal 2a connected to a center tap of the primary winding of a transformer T1 via a series inductor 3. Terminal 2b may be connected to the ground. In one exemplary form of the invention, the DC supply voltage was 150 V. A capacitor 4 is connected in parallel with the primary winding of transformer T1 to form a parallel resonant LC tank circuit that determines the self oscillation frequency of the oscillator circuit.

One end (A) of the tank circuit is connected to common terminal 2b via a series circuit consisting of a diode 5 and an NPN transistor Q1. A capacitor 6 is also connected between said one end A of the tank circuit and the common terminal, thus in parallel with the series circuit of diode 5 and transistor Q1. The other end of the tank circuit (B) is similarly connected to the common terminal via the series circuit of a second diode 7 and an NPN transistor Q2 and via a parallel connected second capacitor 8. The base electrodes of transistors Q1 and Q2 alternately receive square wave drive pulses from a push-pull driver 9. The operation of this inverter circuit when it is self-oscillating is analogous to that described for the oscillator circuit in U.S. Pat. No. 4,628,284, the disclosure of which is incorporated by reference into this application, but with certain modifications to be described below.

A clock pulse generator 10 has one input connected to a start input terminal 11 which initially supplies a train of clock pulses at approximately the oscillation frequency of the oscillator circuit 1 in order to start the apparatus oscillating. As soon as the circuit reaches a steady-state oscillation condition, the clock pulses at terminal 11 are terminated. A secondary winding 12 of the transformer T1 then has a sinusoidal oscillation waveform induced therein by virtue of a sinusoidal oscillation voltage in the parallel resonant circuit comprising the transformer primary winding and capacitor 4. The induced oscillation in winding 12 triggers the clock pulse generator at each zero crossing of the sine wave oscillation voltage. The sinusoidal voltage in secondary winding 12 is applied to a second input of the clock pulse generator to trigger same to generate a train of clock pulses at the frequency of the sinusoidal voltage, i.e. at the operating frequency of the oscillator circuit 1.

Assuming 16 cycles of the sinusoidal voltage constitutes each control period, then a 0–15 count counter 13 is provided which has one input connected to the output of the clock pulse generator 10. Of course, the number 16 chosen is for illustrative purposes only. The number of cycles of the sine wave in a control period will vary with the particular application of the invention and the desired degree of resolution etc.

The outputs $A_2$, $B_2$, $C_2$, $D_2$ of the counter are connected to a first set of inputs of a conventional four-bit digital comparator 14 which also has a group of four set point (reference) inputs 15 to which is applied a digital signal that represents the desired power level of the load, e.g. a magnetron (not shown) coupled to output terminals 26a and 26b. This digital set point signal is received from the outputs $A_1$, $B_1$, $C_1$ and $D_1$ of a shift register 16.

The desired power level for the load is set into the apparatus by means of a desired set point apparatus 27 in accordance with the following table.

| Power Level | Ao | Bo | Co | Do |
|---|---|---|---|---|
| Min. | 0 | 0 | 0 | 0 |
| I | 0 | 0 | 0 | 1 |
| II | 0 | 0 | 1 | 0 |
| III | 0 | 0 | 1 | 1 |
| . | | | | |
| . | | | | |
| XIV | 1 | 1 | 1 | 0 |
| MAX. | 1 | 1 | 1 | 1 |

The shift register 16 is adjusted by means of the apparatus 27 to one of 16 possible states which are represented at its output lines $A_1$, $B_1$, $C_1$ and $D_1$ by the 16 possible digital values shown in the table. The digital valve set into the shift register thus determines the number of ringing cycles, from 1–16, in each consecutive time period of 16 cycles. The greater the desired load power level, the fewer the ringing cycles.

The output 17 of the digital comparator is connected to a first input 18 of an AND gate 24 which has its output connected to a control input 25 of a drive pulse generator 19 of a type that is well known in the art. The output 20 of the clock pulse source 10 is connected to a second input 21 of the AND gate 24.

Figure 2:
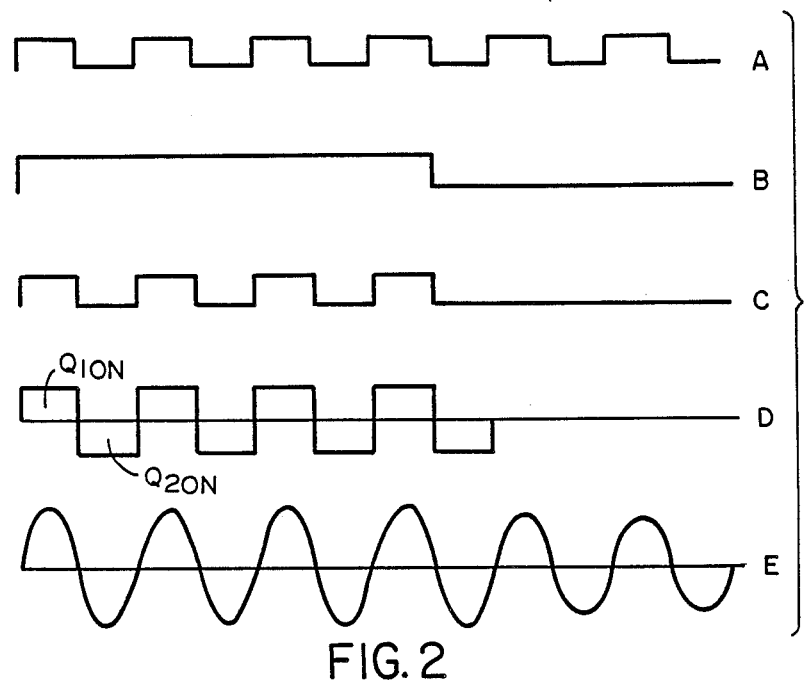
FIG. 2 shows a set of waveforms as a function of time which are useful for an understanding of the operation of the circuit of FIG. 1.

FIG. 2 illustrates various waveforms in the apparatus of FIG. 1 assuming the shift register is set to apply 4 drive pulses in each cycle thereby to allow the oscillator circuit to ring out for 12 cycles (in a 16 cycle control period). FIG. 2A shows the clock pulses applied to the counter 13 and the AND gate 24. FIG. 2B shows that for the assumed adjustment of the shift register, the output at line 17 of the 4-bit comparator 14 is high for the first four clock pulses (cycles). The oscillator circuit sinusoidal output voltage at terminals 26a, 26b is shown in FIG. 2E. As long as the output of the comparator is high, clock pulses are applied to the input of the drive pulse generator via the open AND gate 24. After the fourth clock pulse, the output of counter 13 ($A_2$, $B_2$, $C_2$ and $D_2$) matches the output of shift register 16 ($A_1$, $B_1$, $C_1$ and $D_1$) whereupon the output line 17 of the comparator 14 goes low and thereby closes the AND gate 24 to the passage of further clock pulses at its input 21. During the next twelve clock pulses, the switching transistors Q1 and Q2 of the oscillator circuit do not receive any drive pulses from the push-pull driver and the oscillator circuit self-oscillates with decreasing amplitude for the last twelve cycles of a control period. The first pulse of the next control period switches the counter so that the output line 17 of the four-bit comparator again goes high to open the AND gate 24 to again pass the clock pulses. The cycle of operation described above then repeats itself.

The drive pulse generator 19 alternately supplies drive pulses (see FIG. 2D) over output lines 22 and 23 to the push-pull driver circuit 9 via a pair of AND gates 28 and 29. The push-pull driver circuit in turn alternately supplies drive pulses 180° out of phase to the base electrodes of switching transistors Q1 and Q2. The switching transistors are thus turned on and off in mutually exclusive time intervals so that when transistor Q1 is on, transistor Q2 is off, and vice-versa. FIG. 2C shows the waveform at the output of AND gate 24.

In the example shown, the oscillator circuit receives four drive pulses and then is allowed to self-oscillate for twelve cycles. During the self-oscillation or ring out interval, the amplitude of the oscillations gradually decrease, thus reducing the average power supplied to the load. As mentioned above, the greater the number of ringing cycles, the lower the average power delivered to the load. A very simple and inexpensive technique for adjusting the load power thus is provided by the described power supply circuit. If it is desired to reset the power level of the load, the desired set point apparatus 27 is adjusted in accordance with the power table shown above.

Figure 3:
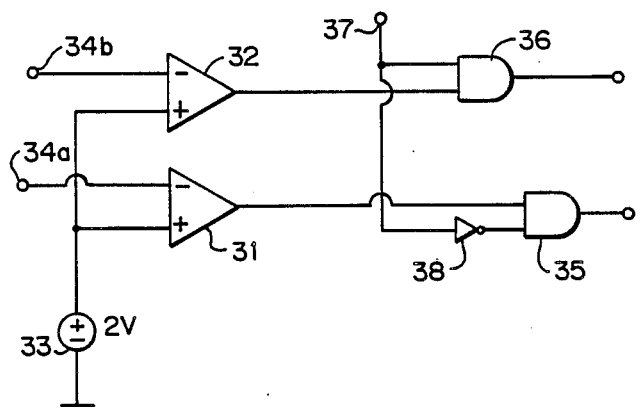
FIG. 3 is a schematic diagram of the collector voltage sense circuit of FIG. 1, FIGS. 4a–4d show voltage waveforms as a function of time which are useful for an understanding of the operation of the collector voltage sense circuit.

In order to limit the power dissipation in the switching transistors Q1 and Q2, a circuit 30 for sensing or detecting the collector voltages of switching transistors Q1 and Q2 is provided. The details of this circuit are shown in FIG. 3. The collector voltage sense circuit 30 is a protection circuit that is useful during turn-on of the switching transistors Q1 or Q2. During the ringing phase of the oscillator circuit it is possible that a small frequency shift of the parallel resonant circuit occurs so that the zero-crossing moment may not correspond exactly with this turn-on. The collector voltage sense circuit ensures that the transistors Q1 and Q2 can only be turned on when their respective collector voltage is two volts or less. The value two volts represents the characteristic forward drop of each transistor when the transistor is fully on. This circuit prevents excessive power losses in the transistors Q1 and Q2 since the circuit 30 will disable or override the base drive signal to these transistors whenever the collector voltage is two volts or more.

The collector voltage sense circuit shown in FIG. 3 consists of a first comparator 31 and a second comparator 32 each of which has its non-inverting input (+) connected to the positive terminal of a two volt reference source 33. The negative terminal of the reference voltage source is connected to ground. The inverting input (−) of comparator 31 is coupled to the collector of transistor Q2 via a terminal 34a. Similarly, the inverting input (−) of a comparator 32 is coupled to the collector of transistor Q1 via a terminal 34b. The outputs of comparators 31 and 32 are connected to respective inputs of AND gates 35 and 36. The AND gate 36 has a second input directly connected to the output of the clock pulse source via a terminal 37. A second input of AND gate 35 is coupled to the clock pulse source via an inverting circuit 38 and the terminal 37.

The operation of the collector voltage sense circuit will be better understood by reference to the waveform diagrams of FIG. 4. FIG. 4A shows the sinusoidal voltage appearing between terminals A and B in FIG. 1 as a function of time. FIG. 4B shows the voltage waveform ($V_A$-gnd) developed between terminal A and ground in FIG. 1. FIG. 4C shows in an expanded time scale a portion of the waveform of FIG. 4B which occurs at the switch-over point for transistor Q1. FIG. 4 initially shows transistor Q2 on and transistor Q1 off. FIG. 4D illustrates the output of the drive pulse generator and shows the switch-over when transistor Q2 is turned off and transistor Q1 is turned on. The optimum turn-on point is shown as $t_1$ in FIG. 4C. During the ringing phase a small phase shift $-t_p$ occurs between the optimum turn-on point $t_1$ and the turn-off point $t_2$ of transistor Q2. As can be seen from FIGS. 4C and 4D, during the small time period $-t_D$ the collector voltage of transistor Q1 is greater than 2V so that the collector voltage sense circuit overrides or disables the $Q_1$-on signal so that transistor Q1 is held in the off state during the short period $-t_D$ that the collector voltage of transistor Q1 exceeds two volts. At the instant $t_3$ the collector voltage of transistor Q1 drops below the reference voltage of two volts and transistor Q1 is allowed to turn on in response to the $Q_1$-on drive pulse. Thus, it is seen that transistor Q1 was disabled until the voltage $V_A$-gnd $\leq 2$ V. In the manner described, switching transistors Q1 and Q2 are disabled whenever their respective collector voltages are two volts or higher, thereby limiting the power dissipation in each of these transistors.

Figure 5:
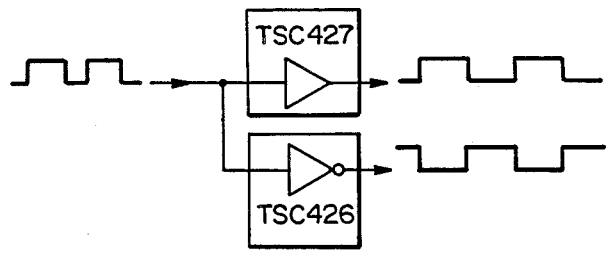
FIG. 5 is a diagram showing one exemplary form of drive pulse generator for use in the circuit of FIG. 1.
Figure 4A:
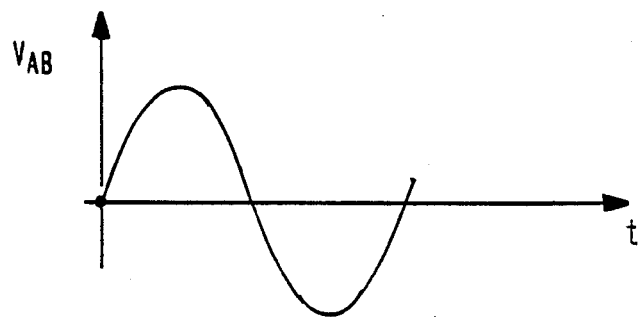
Figure 4B:
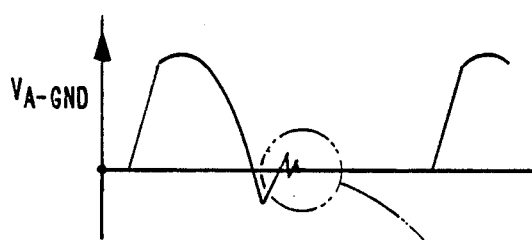
Figure 4C:
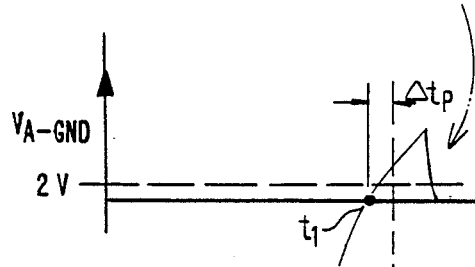
Figure 4D:
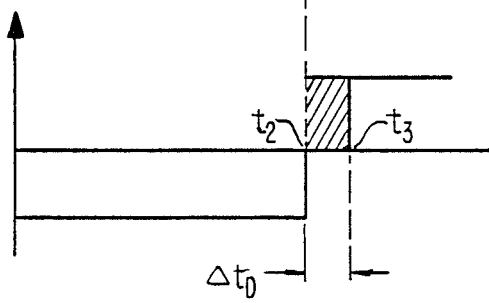

FIG. 5 shows one example of a drive pulse generator circuit that will perform the required functions of the drive pulse generator 19 of FIG. 1. The circuit uses two conventional integrated circuit chips TSC 426 and TSC 427 connected as shown. This drive pulse generator circuit supplies first and second square waves 180° out of phase at its output terminals 22 and 23.

Although the invention has been shown and described with reference to a preferred embodiment thereof, it will be obvious that various changes and modifications may be made therein without departing from the spirit and scope of the invention as defined by the appended claims.

What is claimed is:

1. A power supply circuit with control of the output power comprising:
   a push-pull oscillator circuit including first and second switching transistors coupled to a parallel resonant LC tank circuit comprising a primary winding of a transformer coupled in parallel with a capacitor,
   a push-pull driver having first and second outputs coupled to respective control electrodes of the first and second switching transistors to supply thereto drive pulses approximately 180° out of phase, and
   a drive circuit including a secondary winding of said transformer for supplying the drive pulses to said push-pull driver, said drive circuit further comprising; a source of clock pulses controlled by said secondary winding, a digital set point device for setting a desired output power level of the power supply circuit, and a comparison device coupled to said clock pulse source and said digital set point device for enabling and disabling the supply of drive pulses to the push-pull driver as a function of the setting of said digital set point device whereby in a given time interval the oscillator circuit is allowed to self-oscillate for a number of cycles of the output voltage as determined by said setting.

2. A power supply circuit as claimed in claim 1, further comprising a voltage detection circuit coupled to a collector electrode of at least one of said switching transistors and responsive to the collector voltage to derive an inhibit signal that disables operation of said push-pull driver at a given voltage level of the collector voltage.

3. A power supply circuit as claimed in claim 2, wherein said detection circuit comprises:
   first and second comparators having first inputs coupled to respective collector electrodes of the first and second switching transistors and second inputs connected in common to a source of reference voltage that determines said given voltage level, and
   a logic circuit controlled by outputs of said first and second comparators, and wherein said power supply circuit further comprises:
   a gate circuit controlled by said detection circuit logic circuit so as to control the supply of drive pulses from said drive circuit to the push-pull driver.

4. A power supply circuit as claimed in claim 2, wherein said drive circuit further comprises:
   a counter controlled by the output of the clock pulse source,
   a register controlled by the output of the digital set point device,
   means coupling outputs of said counter and said register to inputs of said comparison device, and
   an AND-type logic circuit having first and second inputs coupled to an output of the counter and an output of the comparison device, respectively, and an output for supplying the drive pulses to the push-pull river under control of said comparison device.

5. A power supply circuit as claimed in claim 1, wherein said drive circuit further comprises:
   a counter controlled by the output of the clock pulse source,
   a register controlled by the output of the digital set point device,
   means coupling outputs of said counter and said register to inputs of said comparison device, and
   an AND-type logic circuit having first and second inputs coupled to an output of the counter and an output of the comparison device, respectively, and an output for supplying the drive pulses to the push-pull driver under control of said comparison device.

6. A power supply circuit as claimed in claim 1, wherein said transformer comprises a further secondary winding for supplying sinusoidal power to a load device.

7. A power supply circuit as claimed in claim 6, wherein said load device comprises a magnetron.

8. A method of generating and supplying an adjustable power level to a load comprising:
   generating in an oscillation device a high frequency oscillatory voltage from a source of DC voltage,
   supplying drive pulses to the oscillation device,
   disabling the supply of drive pulses to the oscillation device as a function of the desired output power level to the load in a manner whereby a self-oscillation voltage of decreasing amplitude is generated, and
   enabling the supply of drive pulses to the oscillation device before the self-oscillation voltage decays to zero voltage level.

9. A method as claimed in claim 8 wherein the oscillation device includes at least one switchable transistor having a collector,
   said method further comprising:
   inhibiting operation of the oscillation device when the collector voltage of said transistor exceeds a given voltage level.

* * * * *

UNITED STATES PATENT AND TRADEMARK OFFICE
CERTIFICATE OF CORRECTION

PATENT NO.  : 4,882,666
DATED       : November 21, 1989
INVENTOR(S) : GERT W. BRUNING ET AL It is certified that error appears in the above-identified patent and that said Letters Patent is hereby corrected as shown below:

```
Claim 4, column 8, line  6, change "counter" to --clock pulse
                                     source--;
                  line  9, change "river" to --driver--.
Claim 5, column 8, line 20, change "counter" to --clock pulse
                                     source--.

Claim 8, column 8, line 43, before "zero" insert --a--.
```

Signed and Sealed this

Thirty-first Day of March, 1992

Attest:

HARRY F. MANBECK, JR.

*Attesting Officer*     *Commissioner of Patents and Trademarks*